April 23, 1957    H. HEMSCHEIDT    2,789,659

AIR CLEANER OF SUCTION TYPE

Filed June 21, 1954

INVENTOR
HERMANN HEMSCHEIDT
BY

United States Patent Office 2,789,659
Patented Apr. 23, 1957

2,789,659

AIR CLEANER OF SUCTION TYPE

Hermann Hemscheidt, Wuppertal-Elberfeld, Germany

Application June 21, 1954, Serial No. 438,187

Claims priority, application Germany June 25, 1953

5 Claims. (Cl. 183—34)

This invention relates to air cleaners and is particularly concerned with a suction type air cleaner by which separation of foreign matter from the air is accomplished as the air is circulated through the air cleaning apparatus.

While the invention is broadly applicable to the cleaning of air or gas laden with various types of foreign matter, it is particularly applicable to the cleaning of air laden with moist foreign particles such as encountered in mining, quarrying and similar rock drilling operations. While it has been customary in the past to provide suction air cleaning for such operations, it has been found that where porous bags are relied upon for separation, the moist condition of stone and rock particles frequently causes them to cling to the outer surface of such bags and quickly embed themselves in the filter passages to preclude further passage of air. Hence, frequent changing of the filter medium is often required. On the other hand, where centrifugal separation is relied upon, the moisture of the foreign matter causes such particles to bind and cling together fouling the walls of the separation chamber and forming masses which are carried along with the air flow, rendering the separation ineffectual.

It is among the objects of the present invention to provide a new and improved air separator, particularly adaptable for the separation of moist particles from air and gas.

Another object of the present invention is to provide an air separator which will combine the inherent qualities of centrifugal separation with those of filter separation without incorporating the disadvantages of either with respect to the cleaning of air or gas laden with moist foreign matter.

A further object of the invention is to provide an air cleaner of the type described in which readily exchangeable means are provided for selectively adapting the device for the efficient cleaning of widely different types of foreign matter differing in moisture content thereof.

More particularly it is an object of the present invention to provide means for preliminarily removing moisture laden foreign matter from an air stream prior to the subjection of such stream to an air filtering bag so that the bag will not become prematurely dirt laden and impervious.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, wherein like reference characters indicate like parts through the several figures and in which:

Figure 1:
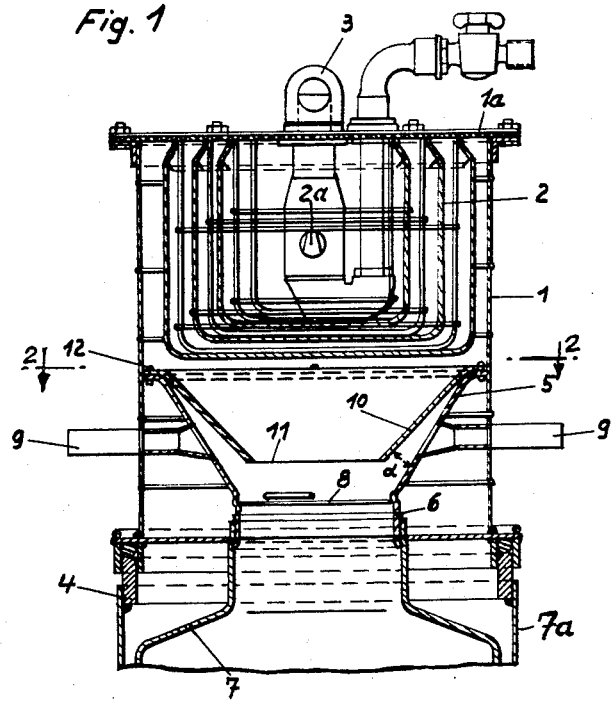
Figure 1 is a vertical sectional view of one form of the present invention.
Figure 2:
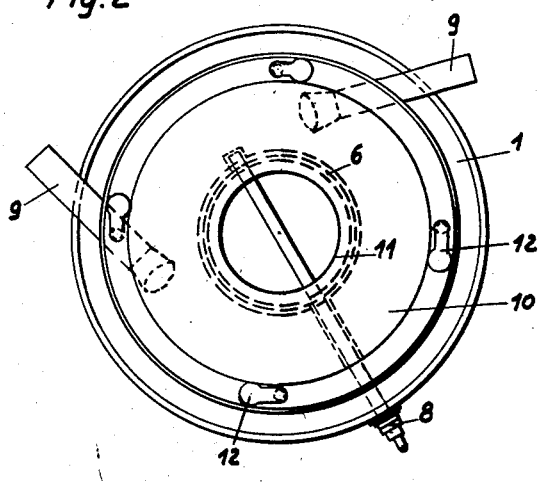
Figure 2 is a horizontal section of the device of Figure 1, taken on line 2—2 of Figure 1.

Referring more particularly to the drawings, the structure of the present embodiment of the invention, here shown by way of example, includes a generally cylindrical upper casing 1, having a top cover plate 1a from which is suspended a conventional concentric series of fabric separator bags 2. A conventional injector type suction means is indicated at 2a mounted within the inner bag and discharging through an outlet 3 to produce the required suction through the device. Below the bags 2 there is mounted within the casing 1 a frusto-conical suction funnel 5 having a bottom cylindrical neck 6 for securement by a closure device 8 to a removable dirt receiving bag 7 contained within a lower casing 7a upon which the casing 1 is mounted and sealingly engaged therewith as at 4. When desired the neck 6 may be closed by a removable closure member.

Air is drawn into the device by the injector 2a through tangentially arranged suction tubes 9 extending through the walls of the casing 1 and opening through the walls of the funnel 5. Concentrically arranged within the funnel 5 there is provided a frusto-conical baffle 10, the lower open and restricted end of which is disposed just below the openings of the tubes 9 through the walls of the funnel 5. The frusto-conical wall of the baffle 10 makes a more acute angle with the base than the funnel 5 and thus an angle $\alpha$ is formed between the baffle and the funnel. The baffle 10 is secured upon an upper horizontal flange of the funnel 5 by pin and key-hole latch means 12 and thus may be readily removed and exchanged by relative rotary motion of the baffle with respect to the funnel.

In operation, the injector 2a draws dust laden air in through the tangential tubes 9 striking the outer wall of the baffle 10. A swirling air current is thus set up about the baffle while air is drawn under the lower edge 11 thereof, causing heavy and moist foreign matter to drop through the neck 6 into the collector bag 7 as the air velocity diminishes while passing upward into the conical expanding diameter of the baffle. Thus, by this preliminary separation stage, the bags 2 are relieved of the burden of separating the whole dirt content and especially the heavier moist fractions thereof.

An important feature of the invention resides in the removability and replaceability of the baffle 10. The pin and key-hole latching means 12 makes such exchange readily convenient. It has been found that for different types of dirt, different particle sizes and particularly different moisture contents, the angle $\alpha$ between funnel 5 and baffle 10 is controlling as to the effectiveness of the preliminary dirt removal. Thus by substitution of baffles of different frusto-conical angularity, the angle $\alpha$ may readily be changed to provide the most effective air flow characteristics. The baffle 10 is preferably formed of corrosion resistant material or has an outer coating or layer of such material so as to resist attack by moisture laden dust and dirt and be protected from mechanical attack by impingement of stone particles.

From the foregoing it will be seen that the invention provides a novel, simple, effective and efficient air cleaner including preliminary dirt separation. The device is particularly adapted to remove coarse and/or moist dirt content, thus protecting the more conventional bag arrangement from overload. Among the outstanding novel features of the present construction is the fact that the supplemental baffle may be inserted without increase in height of a standard device of this general type and the efficiencies are such as to permit use of only the standard suction means. It will of course be understood that the invention is not limited to the specific details and structural arrangements herein set forth but that numerous changes, modifications and the full use of equivalents may be resorted to in the practice of the invention without departure from the spirit or scope of the invention as outlined in the appended claims.

What I claim is:

1. A suction air cleaner for use in circulating, filtering and collecting stone particles and dust from air adjacent a drilling operation, comprising a casing, an injector in the upper portion of said casing, a plate covering the top of the casing, a filter assembly comprising a series of concentric fabric separator bags suspended from said plate, a frusto-conical funnel supported in said casing below said filter assembly and having a cylindrical discharge portion, a dust collecting receptacle detachably secured around said discharge portion, a plurality of inlet passages disposed tangentially to and opening into said casing through said funnel, and a frusto-conical baffle in said casing and supported concentrically within said funnel, the lower edge of the baffle terminating above the lower edge of the funnel but below the plurality of the inlet passages; the wall of the baffle making a smaller angle with its base than the wall of the funnel thus forming a wedge shaped space between the walls of the baffle and funnel.

2. A suction air cleaner as set forth in claim 1 wherein the base portions of the funnel and baffle are provided with flanges with the flange of the baffle supported on the flange of the funnel.

3. A suction air cleaner as set forth in claim 1 in which said baffle is removably mounted on said funnel, and latch means operated by relative rotary motion releasably securing said baffle to said funnel.

4. A suction air cleaner as set forth in claim 1 in which the baffle is formed of a corrosion-resistant material.

5. A suction air cleaner as set forth in claim 1 in which the surface of the baffle adjacent the funnel is provided with a corrosion-resistant coating to resist attack by impinged moisture and particles.

References Cited in the file of this patent

UNITED STATES PATENTS

| | | |
|---|---|---|
| 1,458,720 | Malone | June 12, 1923 |
| 1,968,016 | Dabadie | July 31, 1934 |
| 1,979,873 | Engstrom | Nov. 6, 1934 |
| 2,116,085 | Van Berkel | May 3, 1938 |
| 2,569,865 | Muska | Oct. 2, 1951 |

FOREIGN PATENTS

| | | |
|---|---|---|
| 37,933 | France | Nov. 29, 1930 |
| | (Addition to No. 690,558) | |
| 341,109 | Great Britain | Jan. 12, 1931 |
| 402,087 | Italy | Feb. 16, 1943 |
| 656,320 | Germany | Feb. 3, 1938 |